United States Patent [19]

Bell

[11] 4,328,643
[45] May 11, 1982

[54] GATE ASSEMBLY

[76] Inventor: Edward J. Bell, "Springbok", Injune, Queensland, 4454, Australia

[21] Appl. No.: 172,078

[22] Filed: Jul. 24, 1980

[30] Foreign Application Priority Data

Jul. 26, 1979 [AU] Australia .............................. PD9733

[51] Int. Cl.³ ...................... E05D 15/28; A01K 29/00
[52] U.S. Cl. ....................................... 49/381; 119/155
[58] Field of Search ....................... 49/381, 41, 40, 58, 49/246; 119/155, 99, 103, 96

[56] References Cited

U.S. PATENT DOCUMENTS

| 1,494,290 | 5/1924 | Ruhmann | 49/381 X |
| 3,599,371 | 8/1971 | Barrdero | 49/41 X |
| 4,261,297 | 4/1981 | Van Maarion et al. | 119/155 |

Primary Examiner—Philip C. Kannan
Attorney, Agent, or Firm—McAulay, Fields, Fisher, Goldstein & Nissen

[57] ABSTRACT

A gate assembly including a closure part which moves in a sliding fashion across an opening and elongated supporting members which are pivoted at one end at a point remote from the closure part but in register with the opening and which are connected at their other end to one side of the closure part.

10 Claims, 2 Drawing Figures

GATE ASSEMBLY

This invention relates to an improved gate and in particular to a gate suitable for use in a crush or race or to close a gate opening in the rear of cattle trucks and the like.

In the past, crushes have utilised a sliding gate to close the crush instead of a conventional swinging gate as the sliding gate is not forced open by fore and aft movement of the beast in the crush so that it may be manually closed in stages, if necessary by an operator, against the pressure of the beast. The sliding gate mechanism normally includes a first pair of posts disposed adjacent one side of the crush and a third stabilising post which is disposed outwards of the crush and which with a further post on the opposite side of the crush, supports a rail from which the gate is suspended and guided between the first pair of posts. The stabilising post is normally three to four feet away from the crush and constitutes a permanent obstacle beside the crush on which a beast may be injured, and such gates are relatively complex when compared to a conventional swinging gate and accordingly are relatively expensive to install. Simple hinged gates and sliding gates have also been used to close the rear opening of the cage of a cattle truck, however, hinged gates have proved difficult and awkward to open and sliding gates tend to get jammed in one position due to deformation of the truck chassis and cage after a period of use.

This invention has been devised to overcome the disadvantages of the presently utilised sliding and hinged gates and to provide a swinging gate which will be efficient and reliable in operation. Other objects and advantages of the invention will become apparent from the following description.

With the foregoing and other objects in view, this invention resides broadly in a gate assembly including a closure part adapted to be pivoted to move from a closed position at which said closure part extends across an opening, to an open position to one side of said opening, said closure part being supported by support means pivotable about a substantially vertical axis laterally spaced from and substantially in register with said opening.

In order that the invention may be more readily understood and put into practical effect, reference will now be made to the accompanying drawings which illustrate a preferred embodiment of the invention and wherein:

FIG. 2 illustrates in perspective, the gate of the present invention modified for use in a cattle truck or the like.

Figure 1:
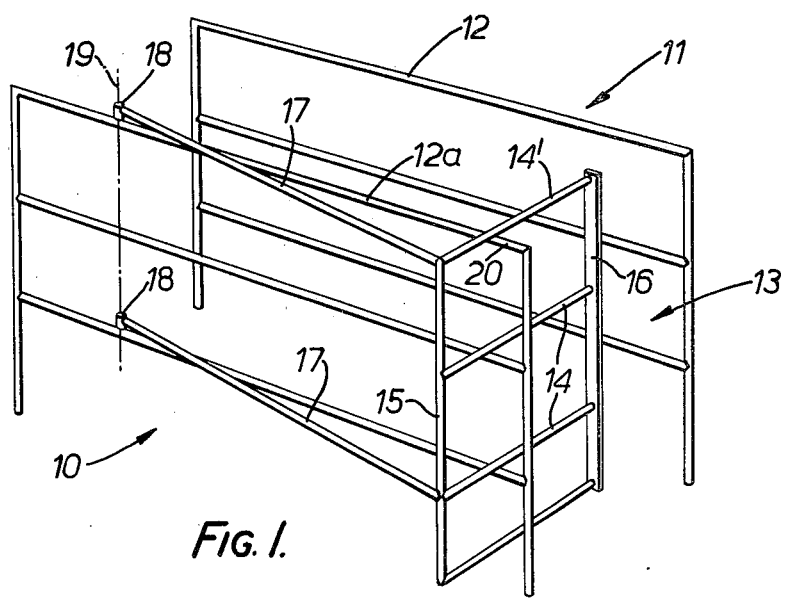
FIG. 1 illustrates in perspective, the gate of the present invention as used with a crush or race.

Referring to FIG. 1 there is shown a gate assembly 10 according to the present invention, adapted for use with a crush or race 11 which has been illustrated diagrammatically by the parallel side panels 12 and 12a respectively. As shown, the gate assembly 10 comprises a closure part 13, defined by a plurality of horizontal rails 14 extending between a pair of vertical frame members or posts 15 and 16 respectively, which is adapted to extend transversely across the crush 11 to close one end thereof, and which is supported by a support structure including supporting frame members 17. The members 17 extend substantially at right angles to the closure part 13 from the outer post 15 thereof to respective coaxial pivot mountings 18 which are mounted on or adjacent the side panel 12a at a point spaced from the closure region of the crush whereby the gate 10 may pivot about a vertical axis 19 from a closed position, at which it extends across the raceway to an open position, substantially clear of the raceway.

As shown, the upper transverse rail 14' of the gate rests upon the upper rail 20 of the side panel 12a so that the weight of the gate is not taken fully by the rails 17 and the pivot mountings 18, whereby the latter can be made relatively light. The post 16 of the closure part is always disposed within the crush 11 whilst the post 15 is always disposed on the outside of the crush and preferably the inner post 16 is in the form of a rectangular section having a slender transverse dimension of say 15 mm so that when the gate is moved to its open position it only intrudes into the raceway a distance equal to the thickness of the inner post 16 so that it does not provide a protrusion against which a beast may be injured during transit therethrough.

It will be seen that when the gate assembly 10 is moved to its closed or partly closed position longitudinal pressure applied by a beast in the crush will not tend to open the crush. This is due to the fact that the pivotal axis of the gate assembly is positioned at a point laterally spaced from the opening and substantially in register therewith which enables the gate to be easily restrained by an operator upon pressure thereagainst by a beast. Preferably an abutment stop is provided on the upper rail 20 of the side panel 12a to co-operate with the upper transverse rail 14' of the gate to prevent the gate being pushed rearwardly by the beast in the crush so that such pressure applied by a beast in the crush is not resisted only by the connection between the closure part 13 and the supporting rails 17.

Preferably the supporting members 17 are at least twice as long as the width of the crush so that transverse movement of the closure part 13 between the open and closed position does not cause large pivotal movement of the supporting members 17 about their vertical pivot axis 19. Thus, the movement of the gate can be easily controlled by an operator even though relatively large forces may be applied to the closure part 13 in a direction longitudinal of the crush.

Of course, the supporting members 17 may be hinged directly to the side rails of the crush or they may be supported independently on a post disposed beside the crush and it will be seen that while the crush is not in use, the gate may be closed so that the support members 17 extend along and lie closely adjacent the side panel 12a so that no protrusions extend beyond the side of the crush to cause an obstacle for beasts.

Figure 2:
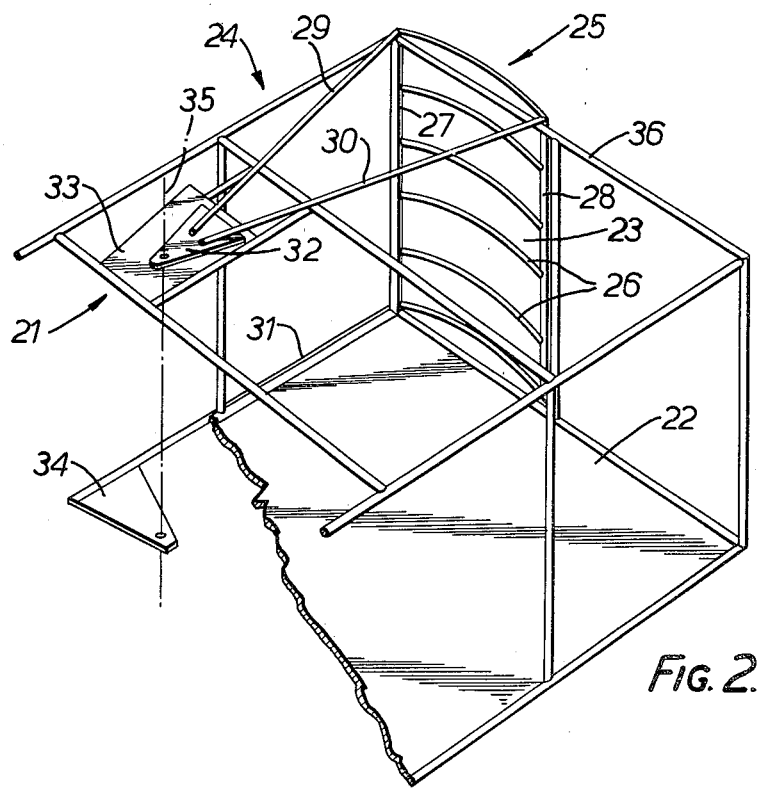

Referring to FIG. 2, there is illustrated a further embodiment of the invention and its application in closing an opening in the rear of a cattle truck cage or the like. The truck cage 21 is defined by a framework which is mounted on and extends from a truck tray 22 and includes an opening 23 located in the rear of the cage 21 and adjacent one corner thereof through which cattle or other animals may be loaded or unloaded.

The gate 24 in this embodiment includes a closure part 25 which is adapted to extend across and close the opening 23 and which includes a plurality of horizontal, preferably arcuate rails 26 extending between substantially vertical posts 27 and 28, the closure part 25 being supported for pivotal movement by an upper support structure including upper frame members 29 and 30 and a lower support structure including a lower frame member 31. The upper members 29 and 30 are disposed above the top of the truck cage and are connected at one end to opposite sides of the closure part 25 and converge towards a support plate 32 to which they are fixed and which is pivotally mounted about a vertical axis to a further plate 33 fixed to the top portion of the cage 21. The closure part 25 is also supported by the lower support member 31 which in the closed position of the gate lies substantially parallel and adjacent to the side wall of the truck cage. The member 31 is connected at one end to the lower outside portion of the closure part and has its other end connected to a bracket 34, which bracket is pivotally mounted to the underside of the truck, about an axis 35 co-axial with the pivotal axis of bracket 32, which axis is laterally spaced from, and in register with the opening 23.

Thus, the gate 24 may pivot about the vertical axis 35 from a closed position wherein the opening 23 in the rear of the truck cage is blocked, to an open position substantially clear of the opening and to one side of the truck.

In use, the upper support members 29 and 30 may be supported by the rail 36 at the rear of the truck cage 21 to ease the load on the respective pivotal connections. A further transverse rail (not shown) may also be provided on the truck framework to slidingly support the upper support members intermediate their ends to further reduce loading on the pivotal connections.

Preferably the support members are arranged at 25° to each other and the support axis 35 is spaced inwardly from the side of the truck cage a distance equal to half the width of the opening. Furthermore, the closure part 25 may be partly filled in by sheeting or the like.

It will, of course, be realised that the above has been given by way of illustrative example and that many modifications and variations of detail and design may be made thereto by persons skilled in the art without departing from the broad scope and ambit of the invention as is herein defined by the appended claims.

I claim:

1. A gate assembly for closing an opening defined by the parallel walls of a crush or race including a closure part adapted to be pivoted to move from a closed position at which said closure part extends across said opening, to an open position to one side of said opening, said closure part being supported by support means pivotable about a substantially vertical axis located on or adjacent one wall of said crush or race and spaced from said opening and said support means being connected to one side of said closure part exteriorly of said crush or race.

2. A gate assembly according to claim 1 wherein said support means in said closed position is disposed substantially parallel and adjacent to said one wall.

3. A gate assembly according to claim 2 wherein said closure part includes two upstanding frame members, one said frame member being disposed always within said crush or race and the other said frame member always being outside of said crush or race.

4. A gate assembly according to claim 3 wherein said one frame member has a slender transverse dimension such as not to project substantially into the crush in the open position of said assembly.

5. A gate assembly according to claim 3 wherein said closure part further includes a plurality of parallel substantially horizontal rails extending between the respective said frame members.

6. A gate assembly according to claim 5 wherein said support means includes upper and lower frame members corresponding first ends of which are connected to said closure part with the respective other ends being pivotally mounted about said vertical axis, said frame members being disposed in a plane substantially at right angles to said closure part.

7. A gate assembly for closing an opening in the corner of a rectangular cage, including a closure part adapted to be pivoted to move from a closed position at which said closure part extends across said opening, to an open position to one side of said opening, said closure part being supported by support means pivotable about a substantially vertical axis, said support means being arranged externally of said cage and said pivotal axis being spaced from said opening and located adjacent or inwardly of a side wall of said cage.

8. A gate assembly according to claim 7 wherein said support means adjacent said closure part is adapted to rest slidably on a fixed rail.

9. A gate assembly according to claim 7 wherein said support means includes an upper pair of frame members each connected at one end thereof to opposite sides of said closure part and converging towards said pivotal axis.

10. A gate assembly according to claim 9 wherein said support means further includes a lower support frame member connected at one end to said closure part, the other end of said lower frame member being mounted via a bracket for pivotal movement about said pivot axis, said lower frame member in the operative closed position of said closure part, lying parallel and closely adjacent to the side of said cage.

* * * * *